(12) United States Patent
Gaab et al.

(10) Patent No.: US 9,370,771 B2
(45) Date of Patent: Jun. 21, 2016

(54) METAL-ORGANIC FRAMEWORK EXTRUDATES WITH HIGH PACKING DENSITY AND TUNABLE PORE VOLUME

(71) Applicant: BASF SE, Ludwigshafen (DE)

(72) Inventors: Manuela Gaab, Heidelberg (DE); Christian Eichholz, Mannheim (DE); Milan Kostur, Mutterstadt (DE); Ulrich Müller, Neustadt (DE); Stefan Maurer, Ludwigshafen (DE)

(73) Assignee: BASF SE (DE)

( * ) Notice: Subject to any disclaimer, the term of this patent is extended or adjusted under 35 U.S.C. 154(b) by 119 days.

(21) Appl. No.: 14/169,902

(22) Filed: Jan. 31, 2014

(65) Prior Publication Data

US 2014/0208650 A1 Jul. 31, 2014

(30) Foreign Application Priority Data

Jan. 31, 2013 (EP) .................................... 13153511

(51) Int. Cl.

| | | |
|---|---|---|
| *B01J 20/22* | (2006.01) | |
| *B01D 53/04* | (2006.01) | |
| *B01J 31/16* | (2006.01) | |
| *C10L 3/10* | (2006.01) | |
| *B01J 20/30* | (2006.01) | |
| *B01J 20/28* | (2006.01) | |
| *B01D 53/02* | (2006.01) | |
| *B01J 20/02* | (2006.01) | |

(52) U.S. Cl.
CPC ............. *B01J 31/1691* (2013.01); *B01D 53/02* (2013.01); *B01J 20/0262* (2013.01); *B01J 20/226* (2013.01); *B01J 20/28042* (2013.01); *B01J 20/3007* (2013.01); *B01J 20/3042* (2013.01); *B01J 20/3078* (2013.01); *C10L 3/10* (2013.01); *B01D 2253/204* (2013.01); *B01D 2253/34* (2013.01)

(58) Field of Classification Search
CPC ............. B01D 53/02; B01D 2253/204; B01D 2253/34; B01J 20/0262; B01J 20/226; B01J 20/28042; B01J 20/3007; B01J 20/3042; B01J 20/3078; B01J 31/1691; C10L 3/10
USPC ......... 95/90, 143, 900; 96/108; 502/400–402, 502/439, 526; 206/0.7; 556/181
See application file for complete search history.

(56) References Cited

U.S. PATENT DOCUMENTS

| | | |
|---|---|---|
| 1,332,847 A | 3/1920 | Kent |
| 2,973,327 A | 2/1961 | Mitchell et al. |
| 3,634,331 A | 1/1972 | Neddenriep |
| 6,893,564 B2 * | 5/2005 | Mueller et al. ............. 210/502.1 |
| 2003/0148165 A1 | 8/2003 | Muller et al. |
| 2003/0222023 A1 | 12/2003 | Mueller et al. |
| 2004/0265670 A1 | 12/2004 | Muller et al. |
| 2006/0210458 A1 | 9/2006 | Mueller et al. |
| 2007/0062369 A1 | 3/2007 | Pfenninger et al. |
| 2008/0190289 A1 | 8/2008 | Muller et al. |
| 2010/0166644 A1 | 7/2010 | Schubert et al. |
| 2011/0011805 A1 | 1/2011 | Schubert et al. |
| 2011/0105776 A1 | 5/2011 | Muller et al. |
| 2012/0082864 A1 | 4/2012 | Leung et al. |
| 2012/0270731 A1 | 10/2012 | Gaab et al. |

FOREIGN PATENT DOCUMENTS

| | | |
|---|---|---|
| DE | 1905019 | 8/1969 |
| DE | 2117479 | 11/1971 |
| DE | 102005000938 | 7/2006 |
| DE | 102005012087 | 9/2006 |
| DE | 102005022844 | 11/2006 |
| EP | 0200260 | 12/1986 |
| EP | 0102544 | 6/1988 |
| EP | 0389041 | 9/1990 |
| EP | 0592050 | 4/1994 |
| EP | 0940174 | 9/1999 |
| EP | 1467811 | 10/2004 |
| EP | 1468731 | 10/2004 |
| EP | 1674555 | 12/2005 |
| JP | 03-037156 | 2/1991 |
| WO | WO-94/13584 | 6/1994 |
| WO | WO-94/29408 | 12/1994 |
| WO | WO-95/19222 | 7/1995 |
| WO | WO-03/061820 | 7/2003 |
| WO | WO-03/064030 | 8/2003 |
| WO | WO-03/102000 | 12/2003 |
| WO | WO-2005/003622 | 1/2005 |
| WO | WO-2005/049484 | 6/2005 |
| WO | WO-2006/050898 | 5/2006 |
| WO | WO-2006/089908 | 8/2006 |
| WO | WO-2008/051904 | 5/2008 |
| WO | WO-2012/042410 | 4/2012 |
| WO | WO-2012/156436 | 11/2012 |

OTHER PUBLICATIONS

PCT International Search Report in PCT/EP2014/051317, mailed Feb. 27, 2014, 12 pages.
Sommer, K., Ullmann's Encyclopedia of Industrial Chemistry, Size Enlargement, Jun. 15, 2000, 1-40.

(Continued)

*Primary Examiner* — Frank Lawrence
(74) *Attorney, Agent, or Firm* — Drinker Biddle & Reath LLP

(57) ABSTRACT

The present invention relates to extruded shaped bodies containing at least one metal-organic framework (MOF), methods for their preparation and their use.

15 Claims, No Drawings

(56) References Cited

OTHER PUBLICATIONS

U.S. Appl. No. 14/169,895, filed Jan. 31, 2014, 17 pages.
U.S. Appl. No. 61/730,073, filed Nov. 27, 2012, 28 pages.
U.S. Appl. No. 14/048,223, filed Oct. 8, 2013, 24 pages.
U.S. Appl. No. 14/048,231, filed Oct. 8, 2013, 31 pages.
U.S. Appl. No. 14/048,358, filed Oct. 8, 2013, 25 pages.
U.S. Appl. No. 61/731,492.
Czaja, Alexander et al., Part Six Large-Scale Synthesis and Shaping of MOFs, *Metal-Organic Frameworks*, Jul. 19, 2011, 339-352.
DIN 66131, Determination of the specific surface area of Solids by gas adsorption using the Brunauer, Ernmett and Teller (BET), Jul. 1993, 7 pages.
DIN 66134, Determination of Pore Size and Specific Surface Area of Mesoporous Solids by Nitrogen, Feb. 1998, 9 pages.
DIN ISO 787; Part 4, General Methods of Test for Pigments and Extenders—Part 4: Determination of Alkalinity or Avidity of the Aqueous Extract, 4 pages, 1983.

PCT International Search Report in PCT/EP2014/051226, mailed Feb. 27, 2014, 4 pages.
Ferreira, Alexandre F. et al., Suitability of Cu-BTC extrudates for propane-propylene separation by adsorption processes, *Chemical Engineering Journal*, vol. 167 2011, 1-12.
Morris, Russell E., Grown into shape: Keeping the organic and inorganic precursors in separate, immiscible solutions guides the grown of metal-organic frameworks into uniform thin layers that are shaped just like the liquid-liquid interface, *Nature Chemistry*, vol. 3 2011, 347-348
Plaza, M.G. et al., Propylene/propane separation by vacuum adsorption using Cu-BTC spheres, *Separation and Purification Technology*, vol. 90 2012, 109-119.
Sorribas, Sara et al., Ordered mesoporous silica-(ZIF-8) core-shell spheres, *Chem. Commun.*, vol. 48 2012 , 9388-9390.
*Ullmann's Encyklopädie der Technischen Chemie* vol. 2, Issue 4 1972, pp. 313-343.

* cited by examiner

METAL-ORGANIC FRAMEWORK EXTRUDATES WITH HIGH PACKING DENSITY AND TUNABLE PORE VOLUME

CROSS-REFERENCE TO RELATED APPLICATIONS

This application claims the benefit of priority under 35 U.S.C. §119(a) to European Patent (EP) Application No. 13153511.4 filed Jan. 31, 2013, which is incorporated by reference in its entirety for all purposes.

FIELD OF THE INVENTION

Embodiments of the present invention relate to extruded shaped bodies containing at least one metal-organic framework (MOF), and methods for their preparation and their use.

BACKGROUND OF THE INVENTION

Due to their large surface areas of up to 10 000 m$^2$/g, MOF materials are of interest for applications in gas storage or gas separation. For most applications, it is necessary to process the pulverulent materials to compact shaped bodies. These can be handled more conveniently and especially in a safer manner, allow better exploitation of the apparatus or tank volumes and prevent large pressure drops. Prerequisites for the successful use of such shaped bodies are, however, the absorption capacity and selectivity thereof, adequate thermal and mechanical stability and high abrasion resistance. Even the recurrent thermal shocks resulting from the heat of adsorption released in the course of continuous adsorption/desorption cycles can be sufficient in the case of the related zeolite shaped bodies to cause fracture and splintering of the bodies (DE 1 905 019). Mechanical stability is therefore indispensable particularly for MOF shaped bodies which are used in vehicle tanks exposed constantly to agitation.

The general preparation of MOF pellets and extrudates is described in WO 2003/102000 and WO 2006/050898.

Kneading and/or pan milling and shaping can be carried out by any suitable method, for example as described in Ullmanns Enzyklopädie der Technischen Chemie, 4th edition, Volume 2, p. 313 ff. (1972).

Binders for the shaping of zeolites are described, for example, in WO 94/29408, EP 0 592 050, WO 94/13584, JP 03-037156 and EP 0 102 544, MOF-containing extrudates have been reported in Chem. Eng. J. 167 (2011) 1-12. The MOF mentioned therein is based on copper and the organic compound trimesate. It is available under the commercial name Basolite C300. A report within the project DE-FC26-07NT43092 of the US Department of Energy mentions a MOF based on nickel and the organic compound 2,5-dihydroxyterephthalic acid. However, no details have been given how these extrudates could be yielded.

The relatively small number of granted patents for MOF shaped bodies underlines that current knowledge in the field is rather basic. There is a lot of room to improve this basic manufacturing technology and adapt the properties of the shaped bodies to the requirements of applications such as the storage and separation of gas. Moreover, the chemical and physical mechanisms underlying the compaction and binding of metal-organic frameworks are by far not as well understood as those of the related class of zeolites. The properties of shaped bodies resulting from the use of new additives and morphologies can hardly be predicted.

BRIEF SUMMARY OF THE INVENTION

Embodiments of the present invention relate to providing MOFs in forms allowing a broad use of these applications.

One or more embodiments also relate to providing mechanically stable extrudates of metal-organic frameworks with high surface area, tunable pore volume and high packing density.

One or more embodiments relate to using the shaped bodies of the invention to gas storage/gas separation. Water steam is almost omnipresent as an impurity in gases. It is known to destabilize the structure of MOFs, especially at higher temperatures. This would lead to a reduced inner surface and gas storage capacity. Therefore, further principles and embodiments of the present invention relate to providing extrudates of metal-organic frameworks with a high stability towards water, in particular to water steam.

One or more embodiments relate to providing a method for preparing a shaped body containing a metal-organic framework material (MOF) comprising the steps of
  (a) mixing a composition comprising the MOF and at least one additive; and
  (b) extruding the composition into a shaped body.
wherein the MOF is dried prior to step (a).

Principles and embodiments of the present invention relate to a method for preparing a shaped body containing a metal-organic framework material (MOF) comprising mixing a composition comprising the MOF and at least one additive, and extruding the composition into a shaped body, wherein the MOF is dried prior to step (a).

In various embodiments the composition of step (a) is dried prior to step (b), wherein the drying of the composition of step (a) prior to step (b) comprises spray-drying.

In some embodiments the MOF in step (a) is applied in the form of spheres.

In one or more embodiments of the method, the at least one additive may comprise at least one binder that is selected from the group consisting of oxidic binders and partially organic binders, preferred aluminum oxide, silicon oxide, clay, cement, and silicon-organic compounds, where the amount of the at least one binder additive based on the total weight of the shaped body may be from 1 to 80 wt.-%.

In some embodiments, the metal of the MOF may be selected from the group consisting of Mg, Zn, Al or mixtures, wherein the metal of the MOF may be Al.

In some embodiments, the MOF comprises aluminum and one or more of the organic compounds selected from fumarate, trimesate, 2-aminoterephthalic acid and 4,4',4"-benzene-1,3,5-triyl-tribenzoate.

Principles and embodiments of the present invention relate to an extruded shaped body comprising a metal-organic framework material (MOF), wherein the metal of the MOF may be selected from the group consisting of Mg, Zn, Al or mixtures thereof. In some embodiments, the metal of the MOF is Al.

In some embodiments, the MOF of the extruded shaped body comprises aluminum and one or more of the organic compounds selected from fumarate, trimesate, 2-aminoterephthalic acid and 4,4',4"-benzene-1,3,5-triyl-tribenzoate. In various embodiments the extruded shaped body further comprises at least one additive.

Principles and embodiments of the present invention relate to a method of uptake of at least one substance, comprising providing an extruded shaped body, and bringing the at least one substance into contact with the extruded shaped body for the purposes of the substance's storage, separation, controlled release, chemical reaction or as support, wherein the at least one substance may be a gas or gas mixture, such as natural gas or shale gas.

In various embodiments, the at least one substance is natural gas or shale gas which is stored in vehicle tanks.

The term "shaped body" as used in the present invention thereby refers to shaped bodies obtained by extrusion processes. The term "shaped body" will be defined further below.

As described above MOFs and their preparation are described in, for example, WO 12/042410. The content of these publications and especially the MOFs disclosed therein, to which reference is made herein, is fully incorporated in the content of the present application.

DETAILED DESCRIPTION OF THE INVENTION

MOFs are powder-like materials that exhibit high surface areas up to 10 000 $m^2/g$. This makes them ideal for storing or separating gases. Some applications can include the storage and/or separation of natural gas or shale gas, such as the storage of natural gas or shale gas in vehicle tanks. These examples, however, do not by any means limit the applicability of the present invention for different storage and separation purposes. The powders have to be compacted prior to using them in most of these applications. The resulting shaped bodies can be used in a more convenient and safer way, as they allow for better use of the volume available in an apparatus or tank and prevent pressure loss.

Important prerequisites for the use of such shaped bodies are their gas uptake capacity and selectivity, appropriate thermal and mechanical stability as well as abrasion resistance. Moreover, they need to exhibit appropriate diffusion properties to allow fast storage of gas molecules in their interior and therefore result e.g. in short tank filling times. These diffusion properties are critically determined by the pore volume of the shaped bodies and the diameter of the pores. Both these properties are directly proportional to the extent of compaction the powder is exposed to. Therefore, the compaction process needs to be carefully adapted to obtain mechanically stable shaped bodies with an appropriate pore volume. According to the various embodiments of the present invention, in addition to the compaction process, the morphology of the MOF powder and the drying technique applied to the MOF material were found to be critical for the resulting pore volume.

Some applications can include the storage and/or separation of natural gas or shale gas, such as the storage of natural gas or shale gas in vehicle tanks. These examples, however, do not by any means limit the applicability of the present invention for different storage and separation purposes. An appropriate manufacturing process yields shaped bodies with high surface area, appropriate mechanical strength and adsorption capacity as well as kinetics with respect to the target application.

Embodiments of the present invention also relate to a method for preparing a shaped body containing a metal-organic framework material (MOF) comprising the steps of mixing a composition comprising the MOF and at least one additive; and extruding the composition into a shaped body, wherein the MOF is dried prior to step (a).

The shaped bodies obtained according to the various embodiments of the present invention can be prepared with any type of MOF material described in the state of the art. As the process involves humidity, moisture-stable MOFs are preferred even though water-sensitive MOFs can be subjected to the extrusion process by adapting the conditions or using an organic solvent. The shaped bodies according to the various embodiments of the invention can exhibit any extrudate shape that is known to the expert in the field (e.g. rods, trilobes, stars). The surface of these extrudates can range from smooth to coarse. Established cutting techniques can be used to manufacture extrudates with identical lengths or narrow length distribution.

While the step of extrusion is mandatory, the following steps are optional according to the present invention:
(I) the extrusion may be preceded by a step of preparing a paste-like mass or a fluid containing the MOF material and, eventually, the binder, for example by adding solvents or other additional substances,
(II) the molding may be followed by a step of finishing, in particular a step of drying, activating or impregnating.

The mandatory step of extrusion may be achieved by any method known to the expert to achieve agglomeration of a powder, a suspension or a paste-like mass. Such methods are described, for example, in Ullmann's Enzyklopädie der Technischen Chemie, 4$^{th}$ Edition, Vol. 2, p. 313 et seq., 1972, whose respective content is incorporated into the present application by reference.

The process is affected by extrusion in conventional extruders, for example such that result in extrudates having a diameter of, usually, from about 1 to about 10 mm, or from about 1 to about 5 mm. Such extrusion apparatuses are described, for example, in Ullmann's Enzyklopädie der Technischen Chemie, 4th Edition, Vol. 2, p. 295 et seq., 1972. In addition to the use of an extruder, an extrusion press may also used for extrusion.

The extrusion may be performed at elevated pressure (ranging from atmospheric pressure to several 100 bar), at elevated temperatures (ranging from room temperature to 300° C.) or in a protective atmosphere (noble gases, nitrogen or mixtures thereof). Any combinations of these conditions are possible as well.

The step of extrusion may be performed in the presence of at least one binder and optionally other additional substances that stabilize the materials to be agglomerated. As to the at least one binder, any material known to the expert to promote adhesion between the particles to be molded together can be employed. A binder, an organic viscosity-enhancing compound and/or a liquid for converting the material into a paste can be added to the MOF material, with the mixture being subsequently compacted in a mixing or kneading apparatus or an extruder. The resulting plastic material can then be molded, in particular using an extrusion press or an extruder, and the resulting moldings can then be subjected to the optional step (II) of finishing, for example drying, activating or impregnating.

A number of compounds can be used as binders. For example, according to U.S. Pat. No. 5,430,000, titanium dioxide or hydrated titanium dioxide can be used as the binder. Examples of further prior art binders are:

hydrated alumina or other aluminum-containing binders (WO 94/29408);
mixtures of silicon and aluminum compounds (WO 94/13584);
silicon compounds (EP-A 0 592 050);
clay minerals (JP-A 03 037 156);
alkoxysilanes (EP-B 0 102 544);
amphiphilic substances.

Other conceivable binders are in principle all compounds used to date for the purpose of achieving adhesion in powdery materials. Compounds, in particular oxygen-containing compounds, of silicon, of aluminum, of boron, of phosphorus, of zirconium and/or of titanium may be used. Of particular interest as a binder are alumina, silica, where the $SiO_2$ may be introduced into the shaping step as a silica sol or in the form of tetraalkoxysilanes, and silicones. Oxides of magnesium and of beryllium and clays, for example montmorillonites, kaolins, bentonites, halloysites, dickites, nacrites and anauxites, may furthermore be used as binders. Specific examples of tetraalkoxysilanes are tetramethoxysilane, tetraethoxysilane, tetrapropoxysilane and tetrabutoxysilane, the analogous tetraalkoxytitanium and tetraalkoxyzirconium compounds and trimethoxy-, triethoxy-, tripropoxy- and tributoxyaluminum, tetramethoxysilane and tetraethoxysilane being particularly preferred.

It was surprisingly found that typical binders such as those applied for the extrusion of zeolites (e.g. aluminum oxide, clays such as e.g. kaolin, attapulgite, bentonite, silicium dioxide, compare DE 1 905 019, DE 2 117 479, U.S. Pat. No. 1,332,847) interact well with the partially organic MOFs yielding mechanically stable shaped bodies with appropriate strength. The expert in the field would expect a change to an at least partially organic binder to be required, as materials with similar polarities are known to interact best with each other. Compare e.g. the basic observation that hydrophile water and hydrophobic oil do not mix. The hardness of the extrudates obtained according to the invention can reach surprisingly high values at least comparable to those of zeolites (e.g. EP 1 467 811, DE 2 117 479), even though partially organic MOFs do not allow for calcination after the shaping stage. Zeolites in comparison require high calcination temperatures (a few hundred ° C.) to yield extrudates of sufficient hardness (e.g. EP 1 467 811). MOFs, however, decompose at these high temperatures due to the organic units being burnt. Surprisingly, thermal treatment at considerably reduced temperatures (e.g. 200° C.) yields shaped bodies with appropriate hardness.

Even more surprisingly these conventional binders do not block the highly porous MOF structures that do exhibit up to the 20-fold surface area compared to zeolites. This high surface area is the prerequisite for MOFs' superior performance in applications such as the storage of natural gas. Preserving the surface area as best as possible in the extrusion process is therefore mandatory. Due to the surprisingly high surface areas of the extrudates obtained according to the invention they do show high methane uptake.

In addition, organic viscosity-enhancing substances and/or hydrophilic polymers, e.g. cellulose or polyacrylates may be used. The organic viscosity-enhancing substance used may likewise be any substance suitable for this purpose, for example hydrophilic polymers, e.g., cellulose, starch, polyacrylates, polymethacrylates, polyvinyl alcohol, polyvinylpyrrolidone, polyisobutene and polytetrahydrofuran. These substances primarily promote the formation of a plastic material during the kneading, molding and drying step by bridging the primary particles and moreover ensuring the mechanical stability of the molding during the molding and the optional drying process.

There are no restrictions with regard to the optional liquid which may be used to create a paste-like substance, either for the optional step (I) of mixing or for the mandatory step of molding. In addition to water, alcohols may be used, provided that they are water-miscible. Accordingly, both monoalcohols of 1 to 4 carbon atoms and water-miscible polyhydric alcohols may be used. For example, methanol, ethanol, propanol, n-butanol, isobutanol, tert-butanol and mixtures of two or more thereof are used. However toluene is also suitable.

Amines or amine-like compounds, for example ammonium, tetraalkylammonium compounds or aminoalcohols and carbonate-containing substances, such as calcium carbonate, may be used as further additives. Such further additives are described in EP-A 0 389 041, EP-A 0 200 260 and WO 95/19222, which are incorporated fully by reference in the context of the present application.

Most, if not all, of the additive substances mentioned above may be removed from the shaped bodies by drying or heating, optionally in a protective atmosphere or under vacuum. In order to keep the MOF material intact, the shaped bodies are preferably not exposed to temperatures exceeding 300° C. However, studies show that heating and/or drying under the aforementioned mild conditions, in particular drying in vacuo, preferably well below 300° C. is sufficient to at least remove organic compounds and water out of the pores of the MOF material. Generally, the conditions are adapted and chosen depending upon the additive substances used.

In general it is possible either to add first the binder, then, for example, the MOF material and, if required, the additive and finally the mixture containing at least one alcohol and/or water or to interchange the order with respect to any of the aforementioned components.

As far as the step of mixing is concerned, for example, of the material containing a MOF material and a binder and optionally further process materials (=additional materials), all methods known to the expert in the fields of materials processing and unit operations can be used. If the mixing occurs in the liquid phase, stirring is preferred, if the mass to be mixed is paste-like, kneading and/or extruding are preferred and if the components to be mixed are all in a solid, powdery state, mixing is preferred. The use of atomizers, sprayers, diffusers or nebulizers is conceivable as well if the state of the components to be used allows the use thereof. For paste-like and powder-like materials the use of static mixers, planetary mixers, mixers with rotating containers, pan mixers, pug mills, shearing-disk mixers, centrifugal mixers, sand mills, trough kneaders, internal mixers, and continuous kneaders are preferred. It is explicitly included that a process of mixing may be sufficient to achieve the molding, i.e., that the steps of mixing and molding coincide.

It was found that extrudates with the best set of mechanical and sorption properties are obtained by using spray dried MOF or MOF that has been mixed with a binder suspension prior to spray-drying, resulting in powder particles that contain a MOF/binder-ratio that is appropriate for extrusion. Moreover the humidity content of the MOF powder can be adjusted via spray-drying over a wide range (e.g. 3 to 60 wt % residual water). Thereby MOF powder can be produced that contains right-away the right amount of binder and water for the extrusion, i.e. it can be directly placed into an extruder without the need to add any other agent. Spray-drying furthermore allows to tune the particle size of the MOF material resulting in spheres with diameters from 2 to 500 μm, preferred from 10 to 200 μm. This is a great advantage as the particle size directly translates into pore volume. Higher pore volume can be generated in the extrudates by applying bigger MOF particles.

In an embodiment, the composition of step (a) is dried prior to step (b). The drying of the composition of step (a) prior to step (b) may comprise spray-drying.

The MOF can be applied as in pulverulent form, as powder or in the form of spheres.

In various embodiments, the at least one additive comprises at least one binder that is selected from the group consisting of oxidic binders and partially organic binder, for example aluminum oxide, silicon oxide, clay, cement, and silicon-organic compounds.

Suitable binders are described below. The at least one binder may be an oxygen containing binder. The at least one binder may also be selected from the group consisting of an oxygen-containing aluminum compound, a silicium oxide and a silicium organic compound, such as tetraethyl orthosilicate.

Such compounds are typically commercially available under trade names like Pural® SB (aluminum oxide), Ludox® AS 40 (colloidal silica), or Silres® MSE100 (methyl and methoxy groups containing polysiloxane).

The amount of the at least one binder additive based on the total weight of the shaped body can range from 0.1 to 90 wt. %, or from 1 to 80 wt.-%.

In another embodiment, the metal of the MOF is selected from the group consisting of Mg, Zn, Al or mixtures thereof, for example Al.

Other MOFs according to embodiments of the inventive method comprise aluminum and one or more of the organic compounds selected from fumarate, trimesate, 2-aminoterephthalic acid and 4,4',4"-benzene-1,3,5-triyl-tribenzoate.

Other MOFs according to embodiments of the inventive method consist essentially of aluminum and one or more of the organic compounds selected from fumarate, trimesate, 2-aminoterephthalic acid and 4,4',4"-benzene-1,3,5-triyl-tribenzoate.

Some MOFs according to various embodiments of the inventive method consist of aluminum and one or more of the organic compounds selected from fumarate, trimesate, 2-aminoterephthalic acid and 4,4',4"-benzene-1,3,5-triyl-tribenzoate.

Some MOFs according to various embodiments of the inventive method are aluminum fumarate, aluminum trimesate, aluminum 2-aminoterephthalic acid, aluminum 4,4',4"-benzene-1,3,5-triyl-tribenzoate or mixtures thereof.

Principles and embodiments of the present invention also relate to an extruded shaped body comprising a metal-organic framework material (MOF), wherein the metal of the MOF is selected from the group consisting of Mg, Zn, Al or mixtures thereof, for example Al.

In an embodiment, the MOF comprises aluminum and one or more of the organic compounds selected from fumarate, trimesate, 2-aminoterephthalic acid and 4,4',4"-benzene-1,3, 5-triyl-tribenzoate.

Aluminum-MOFs are stable in water. Therefore, they can be directly produced in aqueous solutions. These can, e.g. be spray-dried without prior removal of organic compounds. This renders them particularly advantageous on an industrial scale. Most other synthesis routes of MOFs require the use of organic compounds. Many of them are toxic, irritating, explosive, combustible and/or hazardous for the environment. Their handling renders protection measures unavoidable. This includes the e.g. use of non-corrosive material, safety controls, pressure controls and the like. The use of water as exclusive solvent or main component of the solvent would help to minimize these protection measures and the costs related thereto.

In some embodiments, the MOF consists essentially of aluminum and one or more of the organic compounds selected from fumarate, trimesate, 2-aminoterephthalic acid and 4,4',4"-benzene-1,3,5-triyl-tribenzoate.

In various embodiments, the MOF consists of aluminum and one or more of the organic compounds selected from fumarate, trimesate, 2-aminoterephthalic acid and 4,4',4"-benzene-1,3,5-triyl-tribenzoate.

In another embodiment, the MOF is aluminum fumarate, aluminum trimesate, aluminum 2-aminoterephthalic acid, aluminum 4,4',4"-benzene-1,3,5-triyl-tribenzoate or mixtures thereof.

In an embodiment, the extruded shaped body further comprises at least one additive.

Principles and embodiments of the present invention also relates to the f method for the uptake of at least one substance with the shaped bodies comprising a metal-organic for the purposes of its storage, separation, controlled release, chemical reaction or as support.

In an embodiment, the shaped bodies are those comprising a metal-organic framework material (MOF), wherein the metal of the MOF is selected from the group consisting of Mg, Zn, Al or mixtures thereof, such as Al.

In an embodiment, the shaped bodies are those yielded by the inventive method as described above.

The at least one substance may be a gas or gas mixture, for example natural gas or shale gas.

Processes for storage by means of shaped bodies according to the present invention can be used as known for shaped bodies of metal-organic frameworks. In general these are described in WO-A 2005/003622, WO-A 2003/064030, WO-A 2005/049484, WO-A 2006/089908 and DE-A 10 2005 012 087. Examples of gases for storage are methane, methane containing gas mixtures, like natural gas, shale gas or town gas, and hydrogen.

Processes for separation or purification by means of shaped bodies according to various embodiments of the present invention can be used as known for shaped bodies of metal-organic frameworks. In general these are described in EP-A 1 674 555, DE-A 10 2005 000938 and DE-A 10 2005 022 844. A gas which is preferably separated off is carbon dioxide, in particular from a gas mixture which further comprises carbon monoxide. Other gases or volatile components which can be separated off are sulfur-based impurities in natural gas or shale gas like hydrogen sulfide or carbonyl sulfide.

If the shaped bodies of the various embodiments of the invention are used for storage, this may be carried out in a temperature range from −200° C. to +80° C. A temperature range from −80° C. to +80° C. may also be used. A pressure range can be from 1 bar to 300 bar (absolute), or from 2 bar to 250 bar.

For the purposes of the principles and embodiments of the present invention, the terms "gas" and "liquid" are used in the interests of simplicity, but gas mixtures and liquid mixtures or liquid solutions are likewise encompassed by the term "gas" or "liquid".

Examples of gases include hydrogen, natural gas, town gas, hydrocarbons, in particular methane, ethane, ethene, acetylene, propane, propene, n-butane and i-butane, 1-butene, 2-butene, carbon monoxide, carbon dioxide, nitrogen oxides, oxygen, sulfur oxides, halogens, halogenated hydrocarbons, $NF_3$, $SF_6$, ammonia, hydrogen sulfide, ammonia, formaldehyde, noble gases, in particular helium, neon, argon, krypton and xenon.

Particular preference is given to the use of the framework of the embodiments of the invention for the storage of a gas at a minimum pressure of 1 bar (absolute). The minimum may be 3 bar (absolute), or 10 bar (absolute). The gas in this case can be hydrogen, methane or a methane containing gas, like natural gas, shale gas or town gas.

Particular preference is given to the use in vehicles. The term 'vehicle' includes—but shall not be limited to—cars, trucks, ships, airplanes, motorcycles and the like.

In an embodiment, the MOF is used in tanks in the vehicles.

A vehicle can comprise one or more tanks equipped with MOF.

When two or more tanks are used in one vehicle the tanks can be used to store the same gas or gas mixture. They can also be used to store different gases or gas mixtures. For example, one MOF-based tank can be used to store methane and a second MOF-based tank to store hydrogen.

In some embodiments, the gas can be carbon dioxide, which is separated off from a gas mixture comprising carbon dioxide. The gas mixture may comprise carbon dioxide together with at least hydrogen, methane or carbon monoxide. In particular, the gas mixture may comprise carbon monoxide in addition to carbon dioxide. Mixtures may also comprise at least 10 and not more than 45% by volume of carbon dioxide and at least 30 and not more than 90% by volume of carbon monoxide.

An embodiment of the invention relates to pressure swing adsorption using a plurality of parallel adsorber reactors, with the adsorbent bed being made up completely or partly of the material according to the invention. The adsorption phase for the $CO_2/CO$ separation preferably takes place at $CO_2$ partial pressure of from 0.6 to 3 bar and a temperature of at least 20° C., but not more than 70° C. To desorb the adsorbed carbon dioxide, the total pressure in the adsorber reactor concerned is usually reduced to values in the range from 100 mbar to 1 bar.

An embodiment of the invention also relates to the use an extruded shaped body comprising a metal-organic framework material (MOF) to store water, such as water steam.

In an embodiment, the adsorption enthalpy is used for heating the environment.

In a further embodiment, the desorption enthalpy is used for cooling the environment.

Therefore, another embodiment of the invention is the use of an extruded shaped body comprising a metal-organic framework material (MOF) for heating and/or cooling devices.

Another embodiments relate to heating and/or cooling devices comprising at least one extruded shaped body comprising a metal-organic framework material (MOF).

However, the at least one substance can also be a liquid. Examples of such a liquid are disinfectants, inorganic or organic solvents, fuels, in particular gasoline or diesel, hydraulic fluid, radiator fluid, brake fluid or an oil, in particular machine oil. The liquid can also be halogenated aliphatic or aromatic, cyclic or acyclic hydrocarbons or mixtures thereof. In particular, the liquid can be acetone, acetonitrile, aniline, anisol, benzene, benzonitrile, bromobenzene, butanol, tert-butanol, quinoline, chlorobenzene, chloroform, cyclohexane, diethylene glycol, diethyl ether, dimethylacetamide, dimethylformamide, dimethyl sulfoxide, dioxane, glacial acetic acid, acetic anhydride, ethyl acetate, ethanol, ethylene carbonate, ethylene dichloride, ethylene glycol, ethylene glycol dimethyl ether, formamide, hexane, isopropanol, methanol, methoxypropanol, 3-methyl-1-butanol, methylene chloride, methyl ethyl ketone, N-methylformamide, N-methylpyrrolidone, nitrobenzene, nitromethane, piperidine, propanol, propylene carbonate, pyridine, carbon disulfide, sulfolane, tetrachloroethene, carbon tetrachloride, tetrahydrofuran, toluene, 1,1,1-trichloroethane, trichloroethylene, triethylamine, triethylene glycol, triglyme, water or mixtures thereof.

Furthermore, the at least one substance can be an odorous substance.

The odorous substance may be a volatile organic or inorganic compound which comprises at least one of the elements nitrogen, phosphorus, oxygen, sulfur, fluorine, chlorine, bromine or iodine or is an unsaturated or aromatic hydrocarbon or a saturated or unsaturated aldehyde or a ketone. Other elements are nitrogen, oxygen, phosphorus, sulfur, chlorine, bromine; and particular preference is given to nitrogen, oxygen, phosphorus and sulfur.

In particular, the odorous substance may be ammonia, hydrogen sulfide, sulfur oxides, nitrogen oxides, ozone, cyclic or acyclic amines, thiols, thioethers and aldehydes, ketones, esters, ethers, acids or alcohols. Particular preference is given to ammonia, hydrogen sulfide, organic acids (preferably acetic acid, propionic acid, butyric acid, isobutyric acid, valeric acid, isovaleric acid, caproic acid, heptanoic acid, lauric acid, pelargonic acid) and cyclic or acyclic hydrocarbons comprising nitrogen or sulfur and saturated or unsaturated aldehydes such as hexanal, heptanal, octanal, nonanal, decanal, octenal or nonenal and in particular volatile aldehydes such as butyraldehyde, propionaldehyde, acetaldehyde and formaldehyde and also fuels such as gasoline, diesel (constituents).

The odorous substances can also be fragrances which are used, for example, for producing perfumes. Examples of fragrances or oils which can release such fragrances are: essential oils, basil oil, geranium oil, mint oil, cananga oil, cardamom oil, lavender oil, peppermint oil, nutmeg oil, camomile oil, eucalyptus oil, Rosemary oil, lemon oil, lime oil, orange oil, bergamot oil, muscatel sage oil, coriander oil, cypress oil, 1,1-dimethoxy-2-phenylethane, 2,4-dimethyl-4-phenyltetrahydrofuran, dimethyltetrahydrobenzaldehyde, 2,6-dimethyl-7-octen-2-ol, 1,2-diethoxy-3,7-dimethyl-2,6-octadiene, phenylacetaldehyde, rose oxide, ethyl 2-methylpentanoate, 1-(2,6,6-trimethyl-1,3-cyclohexadien-1-yl)-2-buten-1-one, ethyl vanillin, 2,6-dimethyl-2-octenol, 3,7-dimethyl-2-octenol, tert-butylcyclohexyl acetate, anisyl acetate, allyl cyclohexyloxyacetate, ethyllinalool, eugenol, coumarin, ethyl acetoacetate, 4-phenyl-2,4,6-trimethyl-1,3-dioxane, 4-methylene-3,5,6,6-tetramethyl-2-heptanone, ethyl tetrahydrosafranate, geranyl nitrile, cis-3-hexen-1-ol, cis-3-hexenyl acetate, cis-3-hexenyl methyl carbonate, 2,6-dimethyl-5-hepten-1-al, 4-(tricyclo[5.2.1.0]decylidene)-8-butanal, 5-(2,2,3-trimethyl-3-cyclopentenyl)-3-methylpentan-2-ol, p-tert-butyl-alpha-methylhydrocinnamaldehyde, ethyl[5.2.1.0]tricyclodecanecarboxylate, geraniol, citronellol, citral, linalool, linalyl acetate, ionone, phenylethanol and mixtures thereof.

For the purposes of the embodiments of the present invention, a volatile odorous substance preferably has a boiling point or boiling point range below 300° C. The odorous substance is more preferably a readily volatile compound or mixture. In particular, the odorous substance has a boiling point or boiling range below 250° C., or below 230° C., or below 200° C.

The odorous substances may have a high volatility. The vapor pressure can be employed as a measure of the volatility. For the purposes of the embodiments of the present invention, a volatile odorous substance preferably has a vapor pressure of more than 0.001 kPa (20° C.). The odorous substance may be a readily volatile compound or mixture. The odorous substance may have a vapor pressure of more than 0.01 kPa (20° C.), or a vapor pressure of more than 0.05 kPa (20° C.). Particular preference is given to the odorous substances having a vapor pressure of more than 0.1 kPa (20° C.).

In addition, the shaped bodies of the various embodiments of the invention can be used as support, such as support of a catalyst.

The shaped body of the various embodiments of the present invention has a cutting hardness of 0.5 N to 100 N. This is especially preferred for a shaped body that has a diameter of at least 1 mm and not more than 10 mm and a length of at least 1 mm and not more than 30 mm. Preferably, the cutting hardness is from 1.5 N to 50 N. This is especially preferred for a shaped body that has a diameter of at least 1 mm and not more than 5 mm and a length of at least 1 mm and not more than 25 mm, more preferred a diameter of at least 1 mm and not more than 4 mm and a length of at least 1 mm and not more than 20 mm, most preferred a diameter of at least 1 mm and not more than 3 mm and a length of at least 1 mm and not more than 15 mm.

The determination/measurement of the cutting hardness was carried out as described in the earlier German patent application no. 103261137.0 of Jun. 6, 2003 (BASF AG): The cutting hardnesses were measured on an apparatus from Zwick (model: BZ2.5/TS1S; initial loading: 0.5 N, preliminary advance rate: 10 mm/min; test speed: 1.6 mm/min) and are the means of in each case 10 measured catalyst extrudates. In detail, the cutting hardness was determined as follows: Extrudates were loaded with increasing force by means of a cutter having a thickness of 0.3 mm until the extrudate had been cut through. The force required for this is the cutting hardness in N (Newton). The determination was carried out on a testing apparatus from Zwick, Ulm, having a rotating plate in a fixed position and a freely movable, vertical punch with built-in cutter having a thickness of 0.3 mm. The movable punch with the cutter was connected to a load cell to record the force and during the measurement moved towards the rotating plate on which the extrudate to be measured was located. The test apparatus was controlled via a computer which recorded and evaluated the measurement results. 10 straight, preferably crack-free extrudates were taken from a well-mixed sample and their cutting hardnesses were determined and subsequently averaged.

In an embodiment, the specific surface area of the shaped body of the present invention, as calculated according to the Langmuir model (DIN 66131, 66134) is above 50 $m^2/g$, or above 100 $m^2/g$, or above 150 $m^2/g$, or above 500 $m^2/g$ and may increase into the region above 3000 $m^2/g$.

The surface area per volume of the shaped bodies according to the various embodiments of the present invention preferably amounts to 100 $m^2/mL$ or more and may be to 200 $m^2/mL$ or more and even to 300 $m^2/mL$ or more. The values obtained for the surface area were obtained according to the Langmuir model.

The pore volume was determined via mercury porosimetry using an Autopore IV instrument and the Rootare-Prenzlow equation for data evaluation. The pore volume may have a value of from 0.05 to 2.0 mL/g, or 0.1 to 1.5 mL/g, or 0.2 to 1.2 mL/g, or even 0.3 to 1.1 mL/g.

Bulk densities of extrudate packings were determined using a jolting volumeter type STAV II from J. Engelsmann AG. The machine has been tested according to DIN ISO 787 by the manufacturer. A weighed amount of the respective sample was put into a 1000 or 100 mL scaled cylinder. After tapping the cylinder 3000 times, the resulting volume of the packing was determined and the density calculated by dividing sample weight by sample volume.

The bulk density may have a value of from 0.1 to 1.0 g/mL, or from 0.3 to 0.9 g/mL, or even from 0.4 to 0.8 g/mL.

In the context of the various embodiments of the present invention, the term "extrusion" refers to any process known to the expert in the field by which a substance that does not fulfill the above-mentioned requirement of a shaped body, i.e. any powder, powdery substance, array of crystallites etc., can be formed into a shaped body that is stable under the conditions of its intended use by means of an extruder.

Some embodiments of the present invention are illustrated by means of the nonlimiting examples below.

The following examples describe the extrusion of MOFs according to an embodiment of this invention. The material that was applied was prepared as described in WO 12/042410. Its surface area ranged from 1200-1300 $m^2/g$.

The determination/measurement of the cutting hardness was carried out as described in the earlier German patent application no. 103261137.0 of Jun. 6, 2003 (BASF AG): The cutting hardnesses were measured on an apparatus from Zwick (model: BZ2.5/TS1S; initial loading: 0.5 N, preliminary advance rate: 10 mm/min; test speed: 1.6 mm/min) and are the means of in each case 10 measured catalyst extrudates. In detail, the cutting hardness was determined as follows: Extrudates were loaded with increasing force by means of a cutter having a thickness of 0.3 mm until the extrudate had been cut through. The force required for this is the cutting hardness in N (Newton). The determination was carried out on a testing apparatus from Zwick, Ulm, having a rotating plate in a fixed position and a freely movable, vertical punch with built-in cutter having a thickness of 0.3 mm. The movable punch with the cutter was connected to a load cell to record the force and during the measurement moved towards the rotating plate on which the extrudate to be measured was located. The test apparatus was controlled via a computer which recorded and evaluated the measurement results. 10 straight, preferably crack-free extrudates were taken from a well-mixed sample and their cutting hardnesses were determined and subsequently averaged.

The obtained shaped bodies exhibited a relatively broad length distribution due to manual breaking of the strands instead of machine cutting after the extrusion. The smallest and largest lengths ranged from 0.3 to 2.0 cm. After being broken to shorter pieces, the strands were dried (12 h, 100° C.) and calcined (5 h, 200° C.).

The pore volume was determined via mercury porosimetry using an Autopore IV instrument and the Rootare-Prenzlow equation for data evaluation.

Bulk densities of extrudate packings were determined using a jolting volumeter type STAV II from J. Engelsmann AG. The machine has been tested according to DIN ISO 787 by the manufacturer. A weighed amount of the respective sample was put into a 1000 or 100 mL scaled cylinder. After tapping the cylinder 3000 times, the resulting volume of the packing was determined and the density calculated by dividing sample weight by sample volume.

The density of extrudates was determined by weighing a selected extrudate, measuring its diameter and length with a sliding caliper and then dividing weight by volume (the latter being calculated via the diameter and length).

EXAMPLE 1

Extrusion of Spray-Dried Aluminum-Fumarate Powder (Residual Water Content 4 Wt %) without any Additive Aluminum-fumarate MOF (110 g) was densified with water (158 g) in a kneading machine (5 min). The obtained plastic mixture was formed to strands (Ø 2.0 mm) using a strand press.
Bulk density of extrudate packing: 0.59 g/ml
Average density of extrudates: 1.04-1.36 g/ml
Langmuir surface area: 1050 $m^2/g$
Pore volume: 0.24 mL/g (determined via Hg-Porosimetry)
Cutting hardness: 23.6 N
Methane uptake: 60 g/L, 6.0 wt % (at 298 K, 50 bar)

EXAMPLE 2

Extrusion of Spray-Dried Aluminum-Fumarate Powder (Residual Water Content 4 Wt %) with 20 Wt % Pural SB Aluminum-fumarate MOF (110 g) was mixed with Pural SB (27.5 g). The mixture was densified in a first step with diluted formic acid (1.1 g in 10 g water) and in a second step with water (145 g) in a kneading machine (overall 20 min). The obtained plastic mixture was formed to strands (Ø 2.0 mm) using a strand press.
  Bulk density of extrudate packing: 0.58 g/mL
  Average density of extrudates: 0.95-1.18 g/ml
  Langmuir surface area: 979 m$^2$/g
  Pore volume: 0.23 mL/g (determined via Hg-Porosimetry)
  Cutting hardness: 22.0 N
  Methane uptake: 58 g/L, 5.5 wt % (at 298 K, 50 bar)

EXAMPLE 3

Extrusion of Spray-Dried Aluminum-Fumarate Powder (Residual Water Content 4 wt %) with 20 wt % Pural SB Aluminum-fumarate MOF (3000 g) was mixed with Pural SB (750 g). The mixture was densified in a first step with diluted formic acid (22.55 g in 100 g water) and in a second step with water (3100 g) in a mix muller (overall 15 min). The obtained plastic mixture was formed to strands (Ø 2.5 mm) using a strand press.
  Bulk density: 0.72 g/mL
  Average density of extrudates: 1.03-1.35 g/ml
  Langmuir surface area: 672 m$^2$/g
  Pore volume: 0.11 mL/g (determined via Hg-Porosimetry)
  Cutting hardness: 82.7 N
  Methane uptake: 56 g/L (at 298 K, 50 bar)

EXAMPLE 4

Extrusion of Spray-Dried Aluminum-Fumarate Powder (Residual Water Content 4 wt %) with 30 wt % Pural SB Aluminum-fumarate MOF (3000 g) was mixed with Pural SB (1286 g). The mixture was densified in a first step with diluted formic acid (38.6 g in 100 g water) and in a second step with water (4950 g) in a mix muller (overall 15 min). The obtained plastic mixture was formed to strands (Ø 2.5 mm) using a strand press.
  Bulk density: 0.74 g/mL
  Average density of extrudates: 1.13-1.25 g/ml
  Langmuir surface area: 809 m$^2$/g
  Pore volume: 0.16 mL/g (determined via Hg-Porosimetry)
  Cutting hardness: 45.9 N
  Methane uptake: 56 g/L (at 298 K, 50 bar)
  Methane uptake: 1.16 wt % (at 298 K, 921 mmHg)

EXAMPLE 5

Extrusion of Spray-Dried Aluminum-Fumarate Powder (Residual Water Content 57 wt %) with 20 wt % Pural SB Aluminum-fumarate MOF (6170.0 g) was mixed with Pural SB (767.5 g). The mixture was densified in a first step with diluted formic acid (23.0 g in 100 g water) and in a second step with water (1050 g) in a mix muller (overall 4 min). The obtained plastic mixture was formed to strands (Ø 3.5 mm) using a strand press.
  Bulk density: 0.56 g/mL
  Average density of extrudates: 1.00-1.19 g/ml
  Langmuir surface area: 938 m$^2$/g
  Pore volume: 0.26 mL/g (determined via Hg-Porosimetry)
  Cutting hardness: 38.1 N
  Methane uptake: 56 g/L, 5.0 wt % (at 298 K, 50 bar)
  Methane uptake: 1.33 wt % (at 298 K, 918 mmHg)

EXAMPLE 6

Extrusion of Aluminum-Fumarate MOF/Pural SB Spheres (Residual Water Content 60 Wt %, 20 Wt % Pural SB Introduced During Spray-Drying)

Aluminum-fumarate MOF/Pural SB spheres (2857 g) were densified with diluted formic acid (6.2 g in 100 g water) in a mix muller (overall 4 min). The obtained plastic mixture was formed to strands (Ø 3.5 mm) using a strand press.
  Bulk density: 0.46 g/mL
  Average density of extrudates: 0.65-0.81 g/ml
  Langmuir surface area: 1012 m$^2$/g
  Pore volume: 0.45 mL/g (determined via Hg-Porosimetry)
  Cutting hardness: 14.2 N
  Methane uptake: 54 g/L, 5.0 wt % (at 298 K, 50 bar)
  Methane uptake: 1.39 wt % (at 298 K, 918 mmHg)

EXAMPLE 7

Extrusion of Aluminum-Fumarate MOF Filter Cake (Residual Water Content 70 Wt %) without any Additive Aluminum-fumarate MOF filter cake (215.0 g) was mixed with aluminum-fumarate MOF powder (4 wt % residual water, 61.6 g). The mixture was densified in a kneading machine (5 min). The obtained plastic mixture was formed to strands (Ø 2.0 mm) using a strand press.
  Bulk density: 0.46 g/mL
  Average density of extrudates: 0.48-0.97 g/ml
  Langmuir surface area: 1043 m$^2$/g
  Pore volume: 0.24 mL/g (determined via Hg-Porosimetry)
  Cutting hardness: 26.5 N
  Methane uptake: 57 g/L, 6.0 wt % (at 298 K, 50 bar)
  Methane uptake: 1.60 wt % (at 298 K, 918 mmHg)

COMPARATIVE EXAMPLE 8

Pelletizing of aluminum-fumarate MOF powder with graphite Aluminum-fumarate MOF (16154 g) was mixed with graphite (246 g). The mixture was compacted to pellets (3×3 mm) in a Kilian compaction machine.
  Bulk density: 0.35 g/mL
  Langmuir surface area: 1150 m$^2$/g
  Pore volume: 1.13 mL/g (determined via Hg-Porosimetry)
  Cutting hardness: 15.0 N
  Methane uptake: 60 g/L, 6.0 wt % (at 298 K, 50 bar)

TABLE 1

Comparison of extrudate properties from Examples 1 to 7 with respect to Comparative example 8. The increase/decrease of selected properties of Examples 1 to 7 with respect to Comparative example 8 is given in %.

| Example | Shape | MOF | Bulk density [%] | Cutting hardness [N] | CH$_4$ uptake [%] |
|---|---|---|---|---|---|
| 1 | Extrudate | Spray-dried | +42.9 | +54.7 | 0 |
| 2 | Extrudate | Spray-dried | +40.0 | +46.7 | −3.3 |
| 3 | Extrudate | Spray-dried | +77.1 | +451.3 | −6.7 |

TABLE 1-continued

Comparison of extrudate properties from Examples 1 to 7 with respect to Comparative example 8. The increase/decrease of selected properties of Examples 1 to 7 with respect to Comparative example 8 is given in %.

| Example | Shape | MOF | Bulk density [%] | Cutting hardness [N] | $CH_4$ uptake [%] |
|---|---|---|---|---|---|
| 4 | Extrudate | Spray-dried | +74.3 | +206.0 | −6.7 |
| 5 | Extrudate | Spray-dried | +54.3 | +154.0 | −6.7 |
| 6 | Extrudate | Spray-dried | +8.6 | −5.3 | −10.0 |
| 7 | Extrudate | Filter cake | +22.9 | +76.7 | −5.0 |
| 8 (comp.) | Pellet | Spray-dried | 0 | 0 | 0 |

The relative increase of bulk density and especially cutting hardness outweighs the loss of methane uptake capacity.

EXAMPLE 9

Extrusion of aluminum-trimesate MOF (oven-dried) with Pural SB Aluminum-trimesate MOF (120.0 g) was mixed with Pural SB (30.0 g). The mixture was densified in a first step with diluted formic acid (1.0 g in 10 g water) and in a second step with water (228 g) in a mix muller (overall 21 min). The obtained plastic mixture was formed to strands (Ø 3.5 mm) using a strand press.

Bulk density: 0.32 g/mL
Langmuir surface area: 435 m²/g
Pore volume: 1.01 mL/g (determined via Hg-Porosimetry)
Cutting hardness: 9.5 N
Methane uptake: 45 g/L (at 298 K, 50 bar)
Methane uptake: 0.65 wt % (at 298 K, 921 mmHg)

COMPARATIVE EXAMPLE 10

Pelletizing of Aluminum-Trimesate MOF Powder with Graphite

Aluminum-trimesate MOF (46.0 g) was mixed with graphite (1.4 g). The mixture was compacted to pellets (3×3 mm) in a Kilian compaction machine.

Bulk density: 0.46 g/mL
Langmuir surface area: 743 m²/g
Pore volume: 0.39 mL/g (determined via Hg-Porosimetry)
Cutting hardness: 45.0 N

EXAMPLE 11

Catalyst Preparation from Extrudates of Example 9

The extrudates resulting from Example 9 (aluminum-trimesate MOF) were mechanically sized into smaller pieces and sieved to separate a split fraction with size of 0.5 to 0.6 mm. This size fraction was used for testing in the reactor. The resultant catalyst is referred to as the fresh state meaning that is has not been subjected to any hydrothermal aging.

The Langmuir surface area was found to be not altered by the procedure (435 m²/g).

COMPARATIVE EXAMPLE 12

Catalyst Preparation from Pellets of Comparative Example 10

The pellets resulting from comparative Example 10 (aluminum-trimesate MOF) were mechanically sized into smaller pieces and sieved to separate a split fraction with size of 0.5 to 0.6 mm. This size fraction was used for testing in the reactor. The resultant catalyst is referred to as the fresh state meaning that is has not been subjected to any hydrothermal aging.

The Langmuir surface area was found to be 632 m²/g.

EXAMPLE 13

Aging 4.00 g of catalyst from Example 11 were placed in a U-type reactor (49.5 cm length, 0.6 cm diameter). The reactor was fixed in an adjustable furnace and the furnace was heated up to 200° C. A stream of nitrogen (6 l/h) was fed with water vapor (200° C.) via a HPLC-pump with a pump rate of 8.021 g IPA per hour. To avoid the condensation of water, all lines from the saturator to the cryostat were heated above 120° C. The gaseous reaction mixture was fed into the reactor at a weight hourly space velocity of 2.0 g/(g*h). The temperature of the furnace was kept at 200° C. for 2 h with constant water feed. The feed stream then was set on halt and the furnace was allowed to cool to room temperature. To evaluate the cycling stability the described aging tests were repeated up to 5 times. The Langmuir surface area and the surface retention are depicted in Table 1.

TABLE 1

Langmuir surface area and the surface retention Example 13

| Number of cycles | Langmuir Surface area [m²/g] | Surface Retention [%] |
|---|---|---|
| 1 | 446 | 103 |
| 2 | 460 | 106 |
| 5 | 451 | 104 |

COMPARATIVE EXAMPLE 14

Aging 4.00 g of catalyst from Comparative Example 12 were placed in an U-type reactor (49.5 cm length, 0.6 cm diameter). The reactor was fixed in an adjustable furnace and the furnace was heated up to 200° C. A stream of nitrogen (6 l/h) was fed with water vapor (200° C.) via a HPLC-pump with a pump rate of 8.021 g IPA per hour. To avoid the condensation of water, all lines from the saturator to the cryostat were heated above 120° C. The gas reaction mixture fed the reactor at a weight hourly space velocity of 2.0 g/(g*h). The temperature of the furnace was kept at 200° C. for 2 h with constant water feed. The feed stream then was set on halt and the furnace was allowed to cool down to down room temperature. To evaluate the cycling stability the described aging tests were repeated up to 3 times. The Langmuir surface area and the surface retention are depicted in Table 2.

TABLE 2

| | Langmuir surface area and the surface retention Comparative Example 14 | |
|---|---|---|
| Number of cycles | Langmuir Surface area [m²/g] | Surface Retention [%] |
| 3 | 391 | 62 |

The invention claimed is:

1. A method for preparing a shaped body containing a metal-organic framework material (MOF), wherein the MOF is an aluminum MOF directly produced in an aqueous solution, the method comprising the steps of
 (a) mixing a composition comprising the MOF and at least one additive; and
 (b) extruding the composition into a shaped body, wherein the MOF is dried prior to step (a).

2. The method of claim 1, wherein the composition of step (a) is dried prior to step (b).

3. The method of claim 2, wherein the drying of the composition of step (a) prior to step (b) comprises spray-drying.

4. The method of claim 1, wherein the MOF in step (a) is applied in the form of spheres.

5. The method of claim 1, wherein the at least one additive comprises at least one binder that is selected from the group consisting of oxidic binders and partially organic binders.

6. The method of claim 5, wherein the amount of the at least one binder additive based on the total weight of the shaped body is from 1 to 80 wt.-%.

7. A method of claim 1, wherein the MOF comprises one or more of the organic compounds selected from fumarate, trimesate, 2-aminoterephthalic acid and 4,4',4"-benzene-1,3,5-triyl-tribenzoate.

8. An extruded shaped body comprising a metal-organic framework material (MOF), wherein the extruded shaped body is prepared by the method of claim 1.

9. The extruded shaped body of claim 8, wherein the MOF comprises one or more of the organic compounds selected from fumarate, trimesate, 2-aminoterephthalic acid and 4,4',4"-benzene-1,3,5-triyl-tribenzoate.

10. An extruded shaped body of claim 8 further comprising at least one additive.

11. A method of uptake of at least one substance, comprising:
 providing an extruded shaped body of claim 8; and
 bringing the at least one substance into contact with the extruded shaped body for the purposes of the at least one substance's storage, separation, controlled release, chemical reaction or as support.

12. The method of claim 11, wherein the at least one substance is a gas or gas mixture.

13. The method of claim 12, wherein the at least one substance is natural gas or shale gas.

14. The method of claim 13, wherein the at least one substance is natural gas or shale gas which is stored in vehicle tanks.

15. The method of claim 5, wherein the at least one binder is selected from the group consisting of aluminum oxide, silicone oxide, clay, cement, and silicon-organic compounds.

* * * * *